Jan. 20, 1953     F. N. RENAUD, JR., ET AL     2,626,181

TRUNK LID AND ORNAMENTAL ATTACHMENT THEREFOR

Filed May 1, 1950

Frank N. Renaud, Jr.
Stephen J. Paxton
      INVENTORS

BY *Clarence A. O'Brien*
and *Harvey B. Jacobson*
                  Attorneys

Patented Jan. 20, 1953

2,626,181

UNITED STATES PATENT OFFICE 2,626,181

TRUNK LID AND ORNAMENTAL ATTACHMENT THEREFOR

Frank N. Renaud, Jr., Detroit, and Stephen J. Paxton, Hazel Park, Mich.

Application May 1, 1950, Serial No. 159,292

3 Claims. (Cl. 296—37.2)

The present invention relates to certain new and useful improvements in automobile trunk constructions and has more particular reference to a trunk lid equipped with an attachment simulating a spare tire carrier and designed to ornament and distinguish the over-all appearance of the lid in a manner to impart a continental appearance to the rear end of the automobile and to appreciably strengthen and protect the lid against crushing damage.

Individual styling and attractive design characteristics of automobile bodies is a factor of continuing concern to manufacturers and owners of automobiles. It is therefore an object of the present invention to provide an outstanding easy-to-operate trunk lid in which manufacturers and users will find their respective desires and needs fully met and contained.

Another object of the invention is to provide a lid having an added attachment which is fashioned to represent a spare tire carrier and which is structurally unique in that it stands in a substantially vertical position, conforms to and merges with the configuration of the downturned end or apron of the trunk lid and symmetrically "frames" and partly shields the license plate and intimately associated stop light means and fixtures therefor.

More specifically, the invention has to do with a lid and complemental attachment primarily representing a spare tire carrier and made of appropriate sheet material which is correctly finished and balanced in a manner to enhance the over-all appearance of the trunk, said attachment being mounted by a centralized concavo-convex body portion of general discoidal shape which portion is bent and dished to contact and conform to that portion of the lid on which it is adapted to be mounted, and a substantially annular hollow rim portion which is leak-proof and circumscribes the perimeter of the body portion and which has its upper and lower half portions of properly established cross-sections to reenforce and ornament the lid while not materially adding to the weight of said lid.

Other objects and advantages will become more readily apparent from the following description and the accompanying illustrative drawings.

Figure 2:
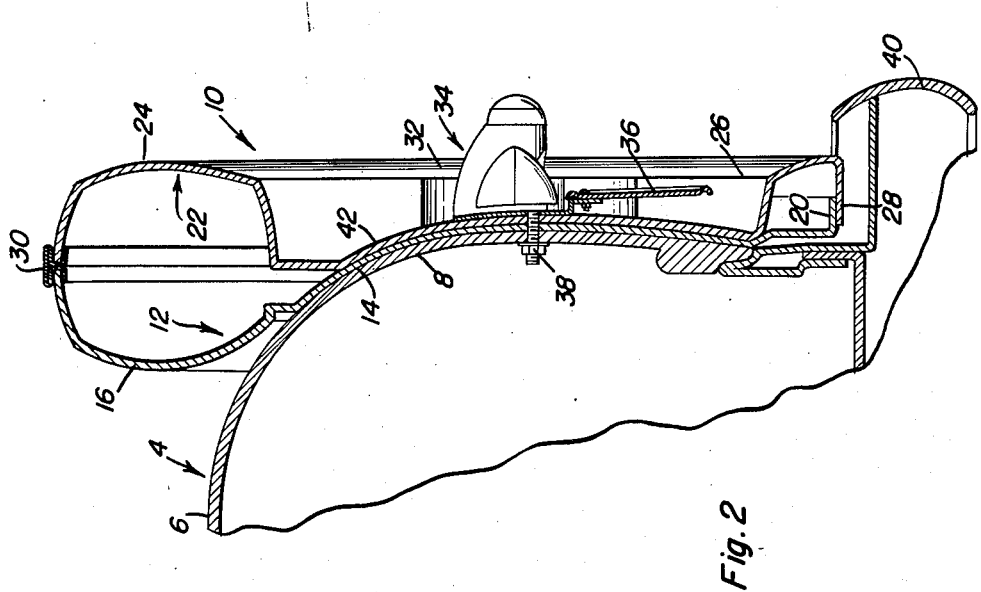
Figure 1:
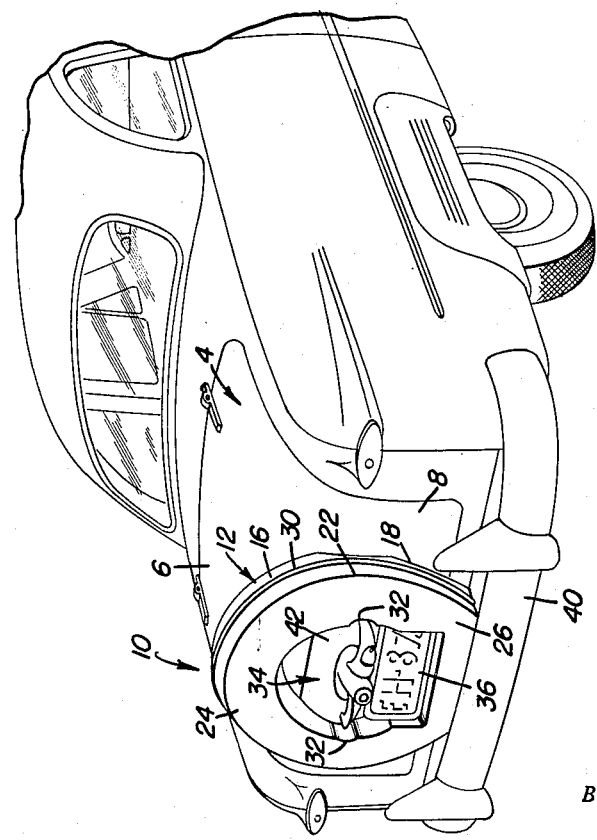

In the accompanying sheet of drawings wherein like numerals are employed to designate like parts throughout the views:

Figure 1 is a fragmentary perspective view of the rear end portion of an automobile showing the trunk lid and companion imitation spare tire carrier constructed in accordance with the principles of the present invention; and, Figure 2 is an enlarged fragmentary sectional and elevational view showing the details of construction with requisite and informative particularity.

Referring now to the drawings by reference numerals and accompanying lead lines, the trunk lid is denoted by the numeral 4 and is hinged in place as usual and has a forward somewhat horizontal portion 6 and a depending rear end or apron portion 8. The ornamental and reenforcing attachment, considered as a unitary structure, is denoted by the numeral 10 and is made up of two shells or component sections. The inner or forward section is denoted in Fig. 2 by the numeral 12 and comprises a substantial discodial plate or body portion 14. This is generally concavo-convex in form and it is obviously bent and dished to firmly contact and conform to the curvature of the cooperating portion 8 of the lid. It may be welded or otherwise secured in place. The marginally encompassing rim is channel-shaped in cross section and is substantially in the form of an annulus. The upper half portion is substantially semi-cylindrical in cross-sectional-shape as denoted at 16 whereas the lower half portion is shallower, channel-shaped in cross section and is denoted by the numeral 18. It is characterized by a lip flange 20 as brought out in Fig. 2.

The companion section, the outer or rear part, is denoted by the numeral 22 and this likewise has its upper half portion relatively large and channel-shaped in cross-section as denoted at 24. The lower half portion is reduced in cross section and forms a shallower channel and the latter is denoted at 26 and it has a lip or flange 28 and thus the two flanges 20 and 28 are telescopically fitted together. The edge portions of the upper parts 16 and 24 abut and are permanently joined together by an appropriate ornamental molding 30. The diametrically opposite inner peripheral notched portions 32 serve to accommodate ends of the brackets or fixtures which embody the stop light means and this is simply and conveniently referred to by the numeral 34 as shown best in Fig. 1. The attachment represents an ornamental tire carrier, also encloses or "frames" and protects the license plate 36 from being bent out of place. The stop light and license plate fixture is bolted in place as at 38 in Fig. 2 and is likewise shielded against crushing damage. The regular bumper is denoted by the numeral 40. The section 22 also includes a concavo-convex body or plate portion 42 which is superimposed upon and secured to the body portion 14 of the section 12.

It is to be noted that when the novel attachment is brought into use its presence on the trunk lid does not necessitate altering the conventional shape of said lid. Moreover, since the attachment itself is comparatively light in weight it does not appreciably increase the over-all weight of the lid with the attachment thereon. This means that raising and lowering the lid is not noticeably interfered with. If an encased automobile wheel were applied directly to the lid it is obvious that it would decrease the strength of the lid and so add to the weight as to be highly objectionable. Since the "tire carrier" is hollow and is therefore more in the nature of an ornament than anything else, it does not interfere with the easy lifting and lowering of the lid and, what is more, the superimposed body or plate portions of the respective shell sections contribute their collective strength to the strength of the apron portion of the lid, thus reenforcing the lid. The fact that the hollow rim portions of the attachment are of suitable cross-section enables the attachment to form a protective well for the license plate and fixtures and tail light. Since the license plate is within the depth of the "well" it is protected against bumping and crushing by the rim portion of the attachment. It will be clear therefore that the attachment is not merely a dummy spare tire carrier ornament but combines with the lid in providing a lid which is reenforced and better equipped to serve its full utility purposes.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In combination, an automobile rear trunk lid having a horizontal forward end and median portion, the rear end of said median portion curving downwardly and gradually merging with a vertical rear end apron portion, and a vertically disposed complemental unit comprising a central body portion conformable to and superimposed on and permanently affixed to and reinforcing said apron portion, and an integrated constantly hollow light weight endless rim portion circumscribing the perimeter edges of the body portion and cooperating with the latter in providing a purely ornamental artificial spare tire carrier, said rim portion being permanently closed, the cross-section of the entire rim portion being greater than the cross-section of said body portion, the upper half of said rim portion being generally circular in cross-section and the top part thereof projecting to a plane above the plane of the forward end and median portions of said lid, and the lower half of said rim portion being generally rectangular in cross-section and the bottom part thereof extending to a plane below the lower edge of said apron portion and being of a cross-section less than the cross-section of said upper half.

2. The structure defined in claim 1, wherein said body portion is in an approximate vertical plane which is spaced forwardly from the plane occupied by the trailing surfaces of said rim portion, whereby to define a protective well, and a license plate holder rigidly fastened to said body portion and located within the confines of said well.

3. For use in conjunction with and as an ornamental complement to an automobile rear trunk lid such as is characterized by a substantially horizontal forward portion, a horizontal median portion and a rear end portion which is vertically disposed and joined with the median portion and constitutes the usual apron-like extension; an artificial spare tire carrier which takes the form of a sheet material ornament and serves to adorn the appearance of the trunk lid and comprises an inner section having a concavo-convex body portion, an outer complemental section having a concavo-convex body portion conforming in shape and size to and superimposed upon and fixed to said first-named concavo-convex body portion, both of said body portions being provided with marginally surrounding endless rim portions each of which is channel-shaped in cross-section, the respective rim portions being opposed with their open channel sides facing each other and being permanently connected and defining an endless rim, the body portions being adapted to be superimposed on the apron of the trunk lid and being conformable in contour and shape with the lid, the cross-section of the entire rim being greater than the cross-section of the collective body portions, the upper half of said rim being generally circular in cross-section and the top thereof projecting so that it will occupy a plane above the plane of the median portion of the lid, and the lower half of said rim being generally rectangular in cross-section and the bottom part thereof being adapted to extend to a plane below the lower edge of the apron and being of a cross-section which is less than the cross-section of said upper half.

FRANK N. RENAUD, Jr.
STEPHEN J. PAXTON.

REFERENCES CITED

The following references are of record in the file of this patent:

UNITED STATES PATENTS

| Number | Name | Date |
|---|---|---|
| 1,783,855 | Radcliffe | Dec. 2, 1930 |
| 1,937,114 | Hansen et al. | Nov. 28, 1933 |
| 2,117,049 | Widman et al. | May 10, 1938 |
| 2,171,786 | Ellenberger | Sept. 5, 1939 |
| 2,553,686 | Stromberg | May 22, 1951 |

FOREIGN PATENTS

| Number | Country | Date |
|---|---|---|
| 713,462 | France | Aug. 17, 1931 |